United States Patent Office 3,598,607
Patented Aug. 10, 1971

3,598,607
METHOD OF MAKING WINE FROM HONEY
Roger A. Morse, Ithaca, and Keith H. Steinkraus, Geneva, N.Y., assignors to Cornell Research Foundation, Inc., Ithaca, N.Y.
No Drawing. Continuation of application Ser. No. 657,491, Aug. 1, 1967. This application Apr. 1, 1970, Ser. No. 22,129
Int. Cl. C12g 1/00
U.S. Cl. 99—35          6 Claims

ABSTRACT OF THE DISCLOSURE

A natural process method of making a 12 to 14 percent alcohol beverage from honey, characterized by the addition of additives to a 20 to 24 percent honey solution to reduce the fermentation time to about two weeks, use being made of yeast strain 618 (Rahn collection), and an incubation temperature of 15° to 18° C.

---

This application is a continuation of application Ser. No. 657,491 filed Aug. 1, 1967, and now abandoned.

Various methods of making wine from honey have been known for centuries. As evidenced by the patents to Adams et al. Nos. 3,100,705 and 3,100,706, sophisticated processes have been developed in recent years as a result of continued research in the wine making art.

In general, wine made from honey has not been particularly popular with the consuming public, since the flavor usually is harsh and bitter, and since the wine has a poor shelf life owing to cloudiness by precipitation. Furthermore, the fermentation time has been relatively long (on the order of six weeks), since the sugar content of honey when combined with even the most optimum yeast is not conducive to a high rate of fermentation. Moreover, it was extremely difficult to reproduce the flavor of honey from batch to batch.

Prior research has revealed that yeast strain 618 (Professor Rahn collection) is the best yeast strain to use in fermenting honey. Citric acid was added to adjust the pH of the mixture, and ammonium phosphate was added to provide the nitrogen required for optimum fermentation. However, notwithstanding to use of an optimum yeast and the addition of citric acid and ammonium phosphate, the wine made from honey had a six week fermentation time and also a harsh, bitter flavor.

The primary object of the present invention is to produce from honey a pleasant flavored table wine having a 12 to 14 percent alcohol content, said wine requiring a greatly shortened fermentation time. By shortening the fermentation time, the growth of organisms which provide undesirable flavors and shorten shelf life is avoided, and more accurately reproducable flavors and conditions are achieved. As distinguished from the aforementioned Adams et al. patents, a "natural" wine making process is provided, in that a relatively low (i.e., about 15° to 18° C.) fermentation temperature is used, whereby the distillation or other treatment of the product is avoided. The invention is further characterized in that the honey is initially diuted to 20– 24 percent sugar and that yeast strain 618 (Professor Rahn collection, available at Cornell University) is used—together with yeast nutrient supplements and additives—so that at least a 12 percent alcohol product is produced in about two weeks, without causing any unpleasant taste in the wine.

A further object of the invention is to produce a honey champagne by the further fermentation of the beverage with a mixture of yeast 223 and 618, and with the addition of yeast nutrients. A mead champagne is produced from clover honey that has a pleasant flavor and retains its carbonization very well.

In accordance with the invention, citric acid is added to poise the acidity of the starting and the finishing point of the honey mixture to the optimum for the growth of the yeast and in a condition causing rapid fermentation. For example, the selected yeast will tolerate the selected degree of acidity while other organisms will not. Additives such as potassium phosphate, magnesium chloride and sodium hydrogen sulphate make the environment favorable for the yeast to have the desired level of metabolism. Ammonium sulphate, peptone and potassium phosphate provide nutrients required by yeast, and thiamine, calcium pantothenate, inositol, pyridoxine and biotin afford the vitamins required by the yeast for optimum action in the metabolic processes.

EXAMPLE 1

A pilot-plant procedure was developed for the production of clover honey mead in approximately 40-gallon lots in 55-gallon oak barrels. The process yielded a dry, light almost colorless mead, devoid of harsh or bitter flavor, and with good stability in the bottle.

Clover honey was diluted with water to 21 percent solids, and the following yeast nutrients were added (per gallon of diluted honey):

citric acid: 18.9 g.
ammonium sulphate: 4.65 g.
potassium phosphate: 1.9 g.
magnesium chloride: 0.7 g.
peptone: 0.1 g.
sodium hydrogen sulphate: 0.2 g.
thiamine: 20.0 mg.
calcium pantothenate: 10.0 mg.
inositol: 7.5 mg.
pyridoxine: 1.0 mg.
biotin: 0.05 mg.

The pH was adjusted to 3.7–4.0 with sodium hydroxide or hydrochloric acid. When cooled to about 27° C. the 40 gallons were placed in the 55 gallon barrel, inoculated with 0.5 percent by volume of actively growing culture of yeast 618, and sealed with a blubber. The fermenting mead was incubated at 18° C., whereupon the mead was allowed to age in the barrel for about 6 months. It was then decanted and filtered through Celite 503 or a similar filter aid. The total acidity, was adjusted to 0.6% with citric or tartaric acid, whereupon the mead was pasteurized at 63° C. for five minutes and bottled while hot. The above process yielded a dry mead with an alcohol content of about 12% by volume. Starting with an initial solid content of 25%, the mead has an alcohol content in the range 14–15%.

EXAMPLE II

In another example, to diluted clover honey (21% solids with water) was added the following yeast nutrients (per gallon of solution):

citric acid: 18.9 g.
ammonium sulfate: 6.0 g.

postassium phosphate: 1.9 g.
magnesium chloride: 0.7 g.
peptone: .38 g.
sodium hydrogen sulphate: 0.2 g.
thiamine: 76 mg.
pantothenate: 38 mg.
inositol: 28 mg.
pyridoxine: 3.8 mg.
biotin: 0.19 mg.

The final pH is adjusted to 4.0 to 4.5, and the mixture is inoculated with yeast strain 618 (Professor Rahn collection). The product is incubated at 15° to 18° C., allowed to age in a barrel for six months, decanted and filtered through Celite 503 or simular filter aid. Total acidity is adjusted to 0.6% with citric or tartaric acid, the mixture is pasteurized at 63° C. for five minutes, and then is bottled while still hot.

EXAMPLE III

In accordance with the present invention, mead champagne may be made from the filtered mead of Example II, by adding 2% sucrose (by weight) as well as the following yeast nutrients (per gallon):

peptone: 0.38 g.
thiamine: 0.076 g.
calcium pantothenate: 0.038 g.
inositol: 28 mg.
ammonium sulphate: 3.2 g.
pyridoxine: 3.8 mg.
biotin: 0.19 mg.

The mixture is inoculated with a mixture of yeasts 223 and 618, filled into champagne bottles and sealed with caps. The product is incubated at 15° to 18° C., and after fermentation is complete and when the champagne has aged for three to six months, the yeast is disgorged by conventional methods, whereupon the bottles are finally corked.

EXAMPLE IV

In another method of making mead champagne, a clover honey base is diluted to about 18–19% solids at the start of fermentation, and the additives of Example I were added to yield a mead with an alcohol content of about 10% by volume. Sucrose (2% by weight) was added to the cuvée with the following yeast nutrients (per gallon):

peptone: 0.1 g.
thiamine: 20.0 mg.
calcium pantothenate: 10.0 mg.
inositol: 7.5 mg.
ammonium sulphate: 0.86 mg.
pyridoxine: 1.0 mg.
biotin: 0.05 mg.

The cuvée was inoculated with a 7% (by volume) yeast inoculum made of equal quantities of champagne yeast 223 and 618, bottled in champagne bottles, sealed with metal caps, and incubated at 18° C. Within 21 days, the alcohol content had increased to 11.9% (by volume) and carbon dioxide pressure to 4.6 atmospheres (at room temperature). Standard disgorging procedures were used to remove the yeast cells. The mead champagne produced from clover honey had a pleasant flavor and retained its carbonation very well. There was a greater tendency to form a head than is generally found in grape champagne.

Clover honey mead was made into a light sherry by refermenting it with a flor sherry yeast, *Saccharomyces oviformis* (strain 31). The acetaldehyde content was raised from 48 to 190 mg./l. in 48 hours by circulating the mead through a glass column filled with ceramic tile pieces inoculated with yeast. Initial content of the mead was 10.4%, which was fortified to an alcohol content of 13% (by volume) before commencing the sherry fermentation. The sherry produced from mead had a definite flor sherry flavor that many tasters preferred to the original mead flavor. Because of its low acidity, mead offers an excellent base for the production of sherry.

While the invention has been described in connection with yeast 618, it is also conceivable that suitable other wine yeasts might be used as well.

While in accordance with the patent statutes the preferred methods have been described, it will be apparent to those skilled in the art that changes may be made without deviating from the invention set forth in the following claims.

What is claimed is:

1. The method of producing from clover honey a beverage which comprises the steps of diluting clover honey with water to form a solution containing about 20% to 24% sugar;
    adding as yeast nutrients per gallon of diluted honey about 4.65 to 6.0 grams ammonium sulfate, about 0.1 to 0.38 gram peptone, about 1.9 grams potassium phosphate, about 0.7 gram magnesium chloride, about 20.0 mg. to 76.0 mg. thiamine, about 10.0 mg. to 38.0 mg. calcium pantothenate, about 7.5 mg. to 28.0 mg. inositol, about 1.0 mg. to 3.8 mg. pyridoxine, and about 0.05 mg. to 0.19 mg. biotin;
    adding as a poising ingredient in sufficient quantity to stabilize the pH value of the nutrient honey solution an organic acid selected from the group consisting of citric acid and tartaric acid;
    adjusting the pH value of the solution to between 3.7 and 4.5;
    inoculating the mixture with yeast strain 618 (Rahn collection); and
    incubating at about 15° to 18° C. for up to about fourteen days to substantially ferment the sugar and thereby produce a honey mead having an alcohol content of between 10% and 14%.

2. The method as defined in claim 1, and further including the steps of decanting and filtering the resultant honey mead, adjusting the total acidity to 0.6% with citric or tartaric acid, pasteurizing the mixture at 63° C. for five minutes, and bottling the mixture while still hot.

3. The method as defined in claim 1, wherein the diluted honey solution has a 20% sugar concentration to produce a resultant honey mead having a 10% to 11% alcohol content, and further including the steps of
    adding to the resultant honey mead 2% sucrose by weight;
    adding, per gallon of solution, 0.1 gram to 0.38 gram peptone, 20.0 mg. to 0.076 gram thiamine, 10.0 mg. to 0.038 gram calcium pantothenate, 7.5 mg. to 28 mg. inositol, 0.86 mg. to 3.2 grams ammonium sulfate, 1.0 mg. to 3.8 mg. pyridoxine, and 0.05 mg. to 0.19 mg. biotin;
    inoculating with a 7% by volume yeast inoculum having equal parts of champagne yeast 223 and yeast 618;
    bottling and capping the mixture;
    incubating at 15° to 18° C. for a period up to twenty-one days to substantially ferment the added sucrose;
    aging for three to six months; and
    disgorging to remove the yeast cells, thereby to provide a mead champagne.

4. The method as defined in claim 1, wherein said poising ingredient comprises about 18.9 grams of citric acid per gallon of solution.

5. The method as defined in claim 1, and further including the steps of:
    aging the mead product in a barrel for at least about six months; and
    decanting and filtering the resultant honey mead.

6. The method as defined in claim 1, and further including the steps of circulating the resultant honey mead for a period up to 48 hours through a glass column filled with ceramic tile pieces inoculated with flor sherry yeast saccharomyces oviformis, whereby a light sherry is formed.

References Cited

UNITED STATES PATENTS

| 2,908,574 | 10/1959 | Luthi. | |
|---|---|---|---|
| 3,100,705 | 8/1963 | Adams et al. | 99—29 |
| 3,112,201 | 11/1963 | Saez. | |
| 3,210,196 | 10/1965 | Cottan et al. | 99—29 |
| 3,402,103 | 9/1968 | Amberg et al. | 195—116X |

OTHER REFERENCES

Filipello et al., Fruit Prods. J. 1934 (pp. 40, 41 and 61).

Herstein, et al., Chemistry and Technology of Mines and Liquors. D. Van Nostrand Co. Inc., N.Y., 1948 (pp. 189 and 197–200).

Clerck, J. D., A Textbook of Brewing, vol. 1, Chapman & Hall, Ltd., London, 1957 (pp. 397–399).

LIONEL M. SHAPIRO, Primary Examiner

D. M. NAFF, Assistant Examiner

U.S. Cl. X.R.

99—38, 41, 47, 48